(12) United States Patent
Fournier et al.

(10) Patent No.: US 12,476,264 B2
(45) Date of Patent: Nov. 18, 2025

(54) SYSTEM FOR REBALANCING A PRESSURE DIFFERENTIAL IN A FUEL CELL USING GAS INJECTION

(71) Applicant: FuelCell Energy, Inc., Danbury, CT (US)

(72) Inventors: Robert S. Fournier, West Hartford, CT (US); Thomas J. Voytek, Newtown, CT (US); Joseph M. Daly, Bethel, CT (US)

(73) Assignee: FuelCell Energy, Inc., Danbury, CT (US)

(*) Notice: Subject to any disclaimer, the term of this patent is extended or adjusted under 35 U.S.C. 154(b) by 0 days.

(21) Appl. No.: 17/352,621

(22) Filed: Jun. 21, 2021

(65) Prior Publication Data
US 2021/0399318 A1 Dec. 23, 2021

Related U.S. Application Data

(60) Provisional application No. 63/042,355, filed on Jun. 22, 2020.

(51) Int. Cl.
*H01M 8/04089* (2016.01)
*H01M 8/0438* (2016.01)
*H01M 8/04746* (2016.01)

(52) U.S. Cl.
CPC ... *H01M 8/04104* (2013.01); *H01M 8/04432* (2013.01); *H01M 8/04761* (2013.01); *H01M 8/04783* (2013.01)

(58) Field of Classification Search
CPC ......... H01M 8/04104; H01M 8/04432; H01M 8/04761; H01M 8/04783; Y02E 60/50
See application file for complete search history.

(56) References Cited

U.S. PATENT DOCUMENTS 3,418,167 A * 12/1968 Plust ................... H01M 8/0258
429/444
9,502,728 B1 * 11/2016 Farooque ............ H01M 8/0612
(Continued)

FOREIGN PATENT DOCUMENTS

CN 108071934 A 5/2018
JP 59-073854 A 4/1984
(Continued)

OTHER PUBLICATIONS

Kanzaki et al. (JP-08222249-A and using Machine Translation as English version) (Year: 1996).*
(Continued)

*Primary Examiner* — Milton I Cano
*Assistant Examiner* — Joshua P McClure
(74) *Attorney, Agent, or Firm* — Foley & Lardner LLP

(57) ABSTRACT

A fuel cell system includes a fuel cell module having an anode having an anode inlet configured to receive anode feed gas and an anode outlet configured to output anode exhaust into an anode exhaust conduit. The fuel cell module further includes a cathode having a cathode inlet configured to receive cathode feed gas and a cathode outlet. The fuel cell system also includes an anode exhaust processing system fluidly coupled to the anode exhaust conduit and a gas injection system disposed downstream of the anode inlet and upstream of the anode exhaust processing system. The gas injection system is configured to inject a gas within the anode exhaust conduit to prevent an under-pressurization condition of the anode.

18 Claims, 6 Drawing Sheets

(56) References Cited

U.S. PATENT DOCUMENTS

| | | | |
|---|---|---|---|
| 9,606,549 B2* | 3/2017 | Nakamura | F16K 47/02 |
| 10,158,133 B2* | 12/2018 | Ok | H01M 8/04089 |
| 10,461,345 B2 | 10/2019 | Komiya | |
| 10,483,562 B2 | 11/2019 | Jahnke et al. | |
| 2006/0115691 A1* | 6/2006 | Hilmen | F02C 6/10 |
| | | | 429/495 |
| 2008/0166611 A1* | 7/2008 | Yoshida | H01M 8/04104 |
| | | | 429/513 |
| 2018/0138528 A1* | 5/2018 | Komiya | H01M 8/04201 |
| 2018/0375121 A1* | 12/2018 | Jahnke | H01M 8/04783 |
| 2019/0074532 A1* | 3/2019 | Bellerive | H01M 8/0488 |
| 2019/0363383 A1* | 11/2019 | Morita | H01M 8/04097 |

FOREIGN PATENT DOCUMENTS

| | | | | | |
|---|---|---|---|---|---|
| JP | 59-123168 A | | 7/1984 | | |
| JP | 04-010360 A | | 1/1992 | | |
| JP | 08222249 A | * | 8/1996 | | H01M 8/04104 |
| JP | H08-222249 A | | 8/1996 | | |
| JP | H8222249 A | | 8/1996 | | |
| JP | 2008-091286 A | | 4/2008 | | |
| WO | WO-2020/039353 | | 2/2020 | | |
| WO | WO-2020/039353 A1 | | 2/2020 | | |

OTHER PUBLICATIONS

International Search Report and Written Opinion in PCT/US2021/038197 dated Nov. 10, 2021 (14 pages).

\* cited by examiner

SYSTEM FOR REBALANCING A PRESSURE DIFFERENTIAL IN A FUEL CELL USING GAS INJECTION

CROSS-REFERENCE TO RELATED PATENT APPLICATIONS

This application claims the benefit of and priority to U.S. Patent Application No. 63/042,355, filed Jun. 22, 2020, the entire disclosure of which is hereby incorporated by reference herein.

BACKGROUND

The present application relates generally to the field of fuel cell systems, and more specifically, to systems for balancing a pressure differential within a fuel cell.

In general, a fuel cell includes an anode (negative electrode) and cathode (positive electrode) separated by a conductive electrolyte that facilitates ion exchange therebetween. A fuel cell produces electric power when the anode and cathode are supplied with fuel and oxidant, respectively. Supply of fuel and oxidant is facilitated by gas flow fields adjacent to each of the anode and cathode. To increase produced power, individual fuel cells can be stacked in series, wherein a conductive separator is disposed between each fuel cell and its adjacent fuel cell. During operation, gas pressure at the anode-side of the fuel cell stack needs to be maintained close to the gas pressure at the cathode side of the fuel cell stack. A blower with a variable frequency drive and speed controller in the anode exhaust stream is commonly used in fuel cell systems to maintain the anode pressure close to the cathode pressure. This is especially true in fuel cell systems having processing of the anode exhaust stream. Such anode exhaust processing may include water recovery, chemical shift reactors and/or anode exhaust export to external systems.

Pressure balance means the anode pressure is nearly the same as the cathode pressure, to within a few inches water column difference. During upsets in the operation of the system, for example when the fuel cell has a rapid drop or rapid increase in power output, a pressure imbalance results from an instantaneous reduction or increase in the volumetric flow rate of the fuel cell anode exhaust. However, the anode blower generally takes several seconds to reduce speed or increase speed to compensate for this reduction or increase in the anode exhaust. During this delay, the flow rate of anode exhaust being supplied to the anode blower is either insufficient in the power reduction case, or too great in the power increase case, relative to the flow rate being drawn into the anode blower. The sudden difference in flow rates results in a pressure decrease or increase in the anode relative to pressure in the cathode (i.e., anode under-pressurization or anode over-pressurization). The anode under-pressurization or over-pressurization may be severe enough to cause damage to the fuel cell, typically by damaging the fuel cell manifold and/or the fuel cell manifold seals.

In some fuel cell manifold designs, anode under-pressurization greater than (i.e., more negative than) −7 inches of water-column pressure (iwc), measured as the difference in pressure between the anode and the cathode, are considered potentially damaging to the fuel cell. Under-pressurization greater than −10 iwc is considered likely to cause fuel cell damage, and greater than −15 iwc is very likely to cause fuel cell damage. Fuel cell damage may be limited to damage of the fuel cell manifolds and the manifold seals. In the case of anode under-pressurization, more severe damage may result from the manifold collapsing, causing mechanical damage to additional components of the fuel cell (e.g., the internal fuel delivery system or impact on the cells including electrical short to the cells). Repairing damage due to under-pressurization may be very costly, with costs sometimes exceeding the value of the fuel cell itself.

Accordingly, it would be advantageous to provide a system for rebalancing a pressure differential in a fuel cell to mitigate or circumvent excessive pressure difference between the anode and the cathode and reduce damage risk to the fuel cell. The system and method described in the exemplary embodiments discussed herein are configured to reduce or eliminate anode under-pressurization through injection of pressurized gas within the anode exhaust piping in response to a change in pressure difference within the fuel cell.

SUMMARY

One aspect of the present disclosure relates to a fuel cell system. The fuel cell system includes a fuel cell module including an anode having an anode inlet configured to receive anode feed gas and an anode outlet configured to output anode exhaust into an anode exhaust conduit. The fuel cell module also includes a cathode having a cathode inlet configured to receive cathode feed gas and a cathode outlet. The fuel cell system further includes an anode exhaust processing system fluidly coupled to the anode exhaust conduit and a gas injection system disposed downstream of the anode outlet and upstream of the anode exhaust processing system, wherein the gas injection system is configured to inject a gas within the anode exhaust conduit to prevent an under-pressurization condition of the anode.

In various embodiments, the gas injection system includes at least one tank in fluid communication with a gas supply, the at least one tank configured to provide flow of the gas into the anode exhaust conduit. In some embodiments, the at least one tank includes a first tank and a second tank, the first tank being directly coupled to a gas supply and the second tank being configured to receive the gas from the first tank, and wherein a flow of the gas from the first tank to the second tank is metered by a first valve. In other embodiments, a pressure within the at least one tank is maintained at a predetermined set point based on an operating condition of the fuel cell system. In various embodiments, the gas injection system is configured to inject the gas responsive to a determination that a pressure differential exceeds a predetermined threshold. In some embodiments, the gas injection system is configured to inject gas based on an operating parameter associated with the fuel cell module.

In various embodiments, the fuel cell system further includes an anode exhaust recirculation system fluidly coupled downstream of the anode exhaust processing system, the anode exhaust recirculation system configured to recirculate anode exhaust from the anode exhaust processing system to the anode exhaust conduit. In some embodiments, the anode exhaust recirculation system is configured to operate cooperatively with the gas injection system, wherein the anode exhaust recirculation system is configured to operate in series with the gas injection system. In yet other embodiments the fuel cell system includes a first poppet valve disposed within a first pathway fluidly coupled between the anode exhaust recirculation system and the gas injection system. In various embodiments, the first poppet valve is fluidly coupled in series with at least one other valve, the at least one other valve configured to allow flow through the anode exhaust recirculation system. In some embodiments, the fuel cell system further includes a second valve disposed within a second fluid pathway fluidly coupled between the anode exhaust recirculation system and the gas injection system, wherein at least one of the first valve or the second valve is fluidly coupled in series with a pressure transmitter, and wherein an output from the pressure transmitter indicates that at least one of the first or the second valve is failed open. In other embodiments, the fuel cell system includes a water seal system in fluid communication with the fuel cell module and configured to prevent an over-pressurization condition of the anode. In various embodiments, the at least one other valve is a solenoid valve.

Another aspect of the disclosure relates to a method of rebalancing pressure within a fuel cell system. The method includes determining, by a pressure differential transmitter, a pressure differential between an anode outlet and the cathode inlet, the anode outlet and cathode inlet being included within a fuel cell module, and injecting, by a gas injection system in fluid communication with the anode outlet of the fuel cell system, a gas from an injection pathway into an anode exhaust conduit. The anode exhaust conduit is fluidly coupled to the anode outlet and to an anode exhaust processing system, and wherein the injection pathway is disposed downstream of the anode outlet and upstream of the anode exhaust processing system and wherein injecting the gas into the anode exhaust conduit causes pressure rebalance between the anode outlet and cathode inlet.

In various embodiments, injecting the gas into the anode exhaust conduit is anticipation of a potential pressure change within the fuel cell module. In some embodiments, injecting the gas into the anode exhaust conduit includes receiving, at a receiver tank, an inert gas from a supply, wherein a peak flow of the gas from the supply to the receiver tank is limited to limit a peak demand on the supply. In other embodiments, the method also includes recirculating, by an anode exhaust recirculation system, anode exhaust from the anode exhaust processing system to the anode exhaust conduit. In some embodiments, recirculating anode exhaust is delayed so as to follow injecting the gas from the injection pathway.

Yet another aspect of the disclosure relates to a method of rebalancing pressure within a fuel cell system, which includes sensing, by a first pressure sensor, a first pressure within an anode outlet conduit fluidly coupled to an anode outlet of a fuel cell module, wherein the first pressure sensor is in communication with a pressure differential regulator. The method further includes sensing, by a second pressure regulator, a second pressure at a cathode inlet included within the fuel cell module, wherein the second pressure sensor is in communication with the pressure differential regulator, and allowing, by the pressure differential regulator, gas to flow through the pressure differential regulator into an injection pathway, wherein the gas flows into the injection pathway and enters the anode exhaust conduit. The gas entering the anode exhaust conduit causes pressure rebalance between the anode outlet and cathode inlet.

In various embodiments, the method further includes recirculating, by an anode exhaust recirculation system in fluid communication with the anode outlet conduit, anode exhaust from the anode exhaust processing system to the anode exhaust conduit. In some embodiments, the gas is an inert gas.

This summary is illustrative only and should not be regarded as limiting.

BRIEF DESCRIPTION OF THE FIGURES

A clear conception of the advantages and features constituting the present disclosure, and of the construction and operation of typical mechanisms provided with the present disclosure, will become more readily apparent by referring to the exemplary, and therefore non-limiting, embodiments illustrated in the drawings accompanying and forming a part of this specification, wherein like reference numerals designate the same elements in the several views, and in which.

Figure 1:
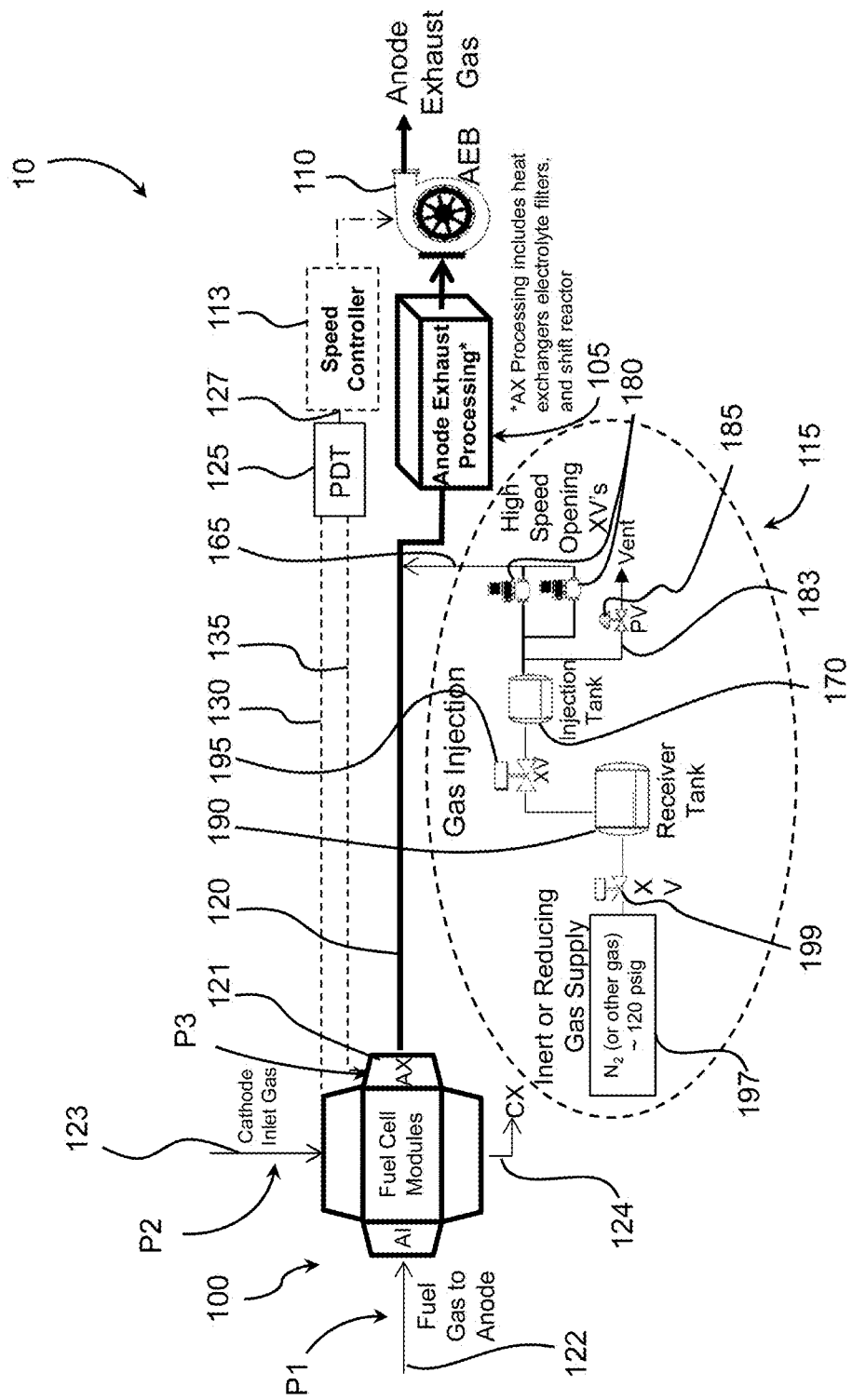
FIG. 1 is schematic representation of a fuel cell system including a gas injection system with active-control valves, according to an exemplary embodiment.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

Various embodiments of the present disclosure relate to a gas injection system including a gas injection tank containing pressurized gas, which is in fluid communication with anode exhaust piping within an anode of a fuel cell. The gas injection tank may be isolated from the anode exhaust piping and metered via a controllable valve, which can be actuated in response to a change in the pressure differential within the fuel cell (e.g., a change in pressure differential between anode and cathode chambers). According to various embodiments, the controllable valve may be actuated with varying speed and/or varying durations to meter gas injected from the gas injection tank into the anode exhaust piping.

In various embodiments, the gas injection system may be configured as part of a passive pressure control system within a fuel cell system, wherein actuation of the gas injection system are passively actuated in response to differential pressures within the fuel cell system.

In various embodiments, the pressurized gas may include, but is not limited to nitrogen, carbon dioxide, and/or other inert or reducing gases.

In various embodiments, mitigating the change in pressure differential between the anode and cathode may be based on a volume and/or flow rate of injected gas, wherein the volume and/or flow rate of injected gas may be further dependent on a volume of the gas injection tank, pressure within the gas injection tank, losses in a gas injection pipe, valve flow area, and/or valve opening speed.

In various embodiments, the gas injection tank is in fluid communication with a main gas supply via a tank fill pipeline and includes a controllable tank fill valve to facilitate maintaining gas injection tank pressure. In various embodiments, the tank fill pipeline may be in fluid communication with one or more receiver tanks, which enable rapid refill of the gas injection tank and reduce demand on the main gas supply.

In various embodiments, the gas injection tank is in fluid communication with a bleed down line having a controllable bleed down valve, which may facilitate removal of gas from the gas injection tank (e.g., release to the atmosphere). In various embodiments, pressure within the gas injection tank can be regulated and maintained at a pressure set point via control of the tank fill valve and/or the bleed down valve. In various embodiments, the pressure set point is adjusted based on one or more operating conditions of a fuel cell power plant containing the fuel cell system.

In various embodiments, the gas injection system may be in fluid communication with the fuel cell system in addition to a water seal, wherein the gas injection system is configured to mitigate anode under-pressure and the water seal is configured to mitigate anode over-pressure.

In various embodiments, the gas injection system may be in fluid communication with the fuel cell system in addition to one or more anode recirculation valves, wherein each of the one or more anode recirculation valves is configured to aid in mitigating anode under-pressurization in conjunction with the gas injection system.

In various embodiments, when the gas injection system is used in conjunction with the one or more anode recirculation valves, a poppet valve system is configured to passively prevent the anode recirculation valves from actuating until after the gas injection system has substantially completed the gas injection.

Referring generally to the figures, a fuel cell system includes at least one fuel cell (having an anode and a cathode) and a fluidly coupled anode exhaust processing system, wherein anode exhaust output by the fuel cell is processed and/or converted for export or use elsewhere within the fuel cell system. In various embodiments, the anode exhaust processing system may cool, react and/or isolate one or more components (e.g., byproducts) from the anode exhaust. The fuel cell system may include an anode exhaust blower, which receives processed anode exhaust (e.g., processed stream from the anode exhaust processing system) and may be configured to maintain an anode pressure within a comparable range to a cathode pressure. The anode exhaust blower may be communicatively coupled to a controller and/or pressure sensor, wherein at least one of the pressure sensor and controller is configured to measure a difference between the anode pressure and the cathode pressure and, in response, cause a speed adjustment of the anode exhaust blower to maintain a predetermined and/or desired pressure differential. The fuel cell system may include one or more pressure rebalancing systems to minimize, mitigate, or eliminate pressure differentials between the anode and cathode that may be greater or less than the predetermined and/or desired pressure differential and, consequently, prevent potential damage within the fuel cell system (e.g., to the fuel cell itself, the fuel cell manifolds, and/or the fuel cell manifold gaskets). In various embodiments, the pressure differential may be greater or less than the predetermined and/or desired pressure differential due to a sudden decrease or increase in a fuel cell output, a failure of the anode exhaust blower, and/or an upset in the anode exhaust processing system.

In various embodiments, the fuel cell system may include a gas injection system, which may be used to minimize or eliminate anode under-pressure within the fuel cell system. The gas injection system includes a gas injection tank containing pressurized gas, which is in fluid communication with anode exhaust piping within an anode compartment of a fuel cell. The gas injection tank is isolated from the anode exhaust piping by a controllable valve, which can be actuated in response to a change in the pressure differential within the fuel cell, such as a change in pressure differential between anode and cathode chambers. The controllable valve may be actuated with varying speed and for varying durations to meter gas injected from the gas injection tank into the anode exhaust piping. Mitigating the change in pressure differential between the anode and cathode is based on a volume and/or flow rate of injected gas, wherein the volume and/or flow rate of injected gas is further dependent on a volume of the gas injection tank, pressure within the gas injection tank, losses in a gas injection pipe, valve flow area, and/or valve opening speed. Pressure within the gas injection tank, which is typically maintained at a pressure significantly higher than pressure associated with the anode, can be easily controlled and set ahead of time based on fuel cell operation. A flow rate, time-decay of flow rate, and total quantity of injected gas through an orifice and/or valve associated with the gas injection tank is highly predictable, thereby improving overall control of pressure rebalance operations within the fuel cell system.

In various embodiments, the gas injection tank can be in fluid communication with a main gas supply via a tank fill pipeline, which facilitates filling or refilling the gas injection tank. Filling the gas injection tank can be facilitated by a controllable tank fill valve. In various embodiments, the tank fill pipeline may be in fluid communication with one or more receiver tanks, which enable rapid refill of the gas injection tank and reduce peak (e.g., instantaneous) demand on the main gas supply. In various embodiments, the gas injection tank is in fluid communication with a bleed down line, whereby gas can be rejected and released to the atmosphere. Gas flow through the bleed down line can be controlled by a bleed down valve. Pressure within the gas injection tank can be regulated and maintained at a pressure set point via control of the tank fill valve and/or the bleed down valve. This pressure control scheme provides for a faster refill rate than if pressure was controlled by the tank fill valve. In various embodiments, the pressure set point is adjusted based on one or more operating conditions of a fuel cell power plant containing the fuel cell system.

Referring now to FIG. 1, a fuel cell system 10, which incorporates a system for rebalancing a pressure differential, is shown, according to an exemplary embodiment. As shown, fuel cell system 10 includes a fuel cell module 100, which is in fluid communication with each of an anode exhaust processing system 105, an anode exhaust blower 110 controlled by controller 113, and an actively-controlled gas injection system 115 configured to facilitate rebalancing a pressure differential, wherein the fluid communication is facilitated by anode exhaust pipe 120 (e.g., conduit). In various non-limiting embodiments, the fuel cell module 100 may be a Molten Carbonate Fuel Cell (MCFC) and may operate between approximately 550-650° C. In other embodiments, the fuel cell module 100 may include one or more fuel cells of any type known in the art, including other high, mid, or low temperature fuel cell modules. In various embodiments, the fuel cell module may comprise one or more fuel cells arranged in stacks, wherein the stacks may be configured in parallel and/or in series.

Anode exhaust pipe 120 enables anode exhaust from fuel cell module 100 to exit, via an anode outlet 121 (e.g., at an anode exhaust manifold coupled to the anode outlet 121). Fuel cell module 100 includes at least one fuel cell and receives fuel gas via an anode inlet 122 (e.g., at an anode inlet manifold coupled to the anode inlet 122). The fuel cell module 100 also includes a cathode inlet 123 (e.g., at a cathode inlet manifold coupled to the cathode inlet 123 for receiving cathode feed gas) and a cathode outlet 124. The anode inlet 122 may have an anode inlet pressure P1, wherein P1 may be defined as a pressure of the anode fuel gas at the anode inlet 122. The cathode inlet 123 may similarly have a cathode inlet pressure P2, wherein P2 may be defined as a pressure of the cathode feed gas ("inlet gas") at the cathode inlet 123. The anode outlet 121 may have an anode outlet pressure P3, wherein P3 may be defined as a pressure of the anode exhaust at the anode outlet 121.

A pressure differential, which may be measured between either P1 and P2, or P3 and P2, may be determined by a pressure differential transmitter (PDT) 125. As shown in FIG. 1, PDT 125 may be configured to measure a pressure differential between the anode outlet 121 (P3) and the cathode inlet 123 (P2) via gas pressure sensing lines 135 and 130, respectively. In various embodiments, PDT 125 may be configured to measure a pressure differential between P1 and P2, and/or between P3 and P2. As previously described, a high pressure differential within the fuel cell module 100 can cause damage within the fuel cell system 10. If a pressure associated with the cathode (e.g., P2 and/or other fluidly connected point) is large relative to a pressure associated with the anode (e.g., P1, P3, and/or pressure at other fluidly connected point), the anode may be at risk of under-pressurization. Conversely, if a pressure associated with the anode (e.g., P1, P3, and/or pressure at other fluidly connected point) is large relative to a pressure associated with the cathode (e.g., P2 and/or other fluidly connected point), the anode may be at risk of over-pressurization.

As shown in FIG. 1, the fuel cell system 10 includes anode exhaust blower 110, which is configured to receive anode exhaust (via anode exhaust pipe 120) from anode exhaust processing system 105. Anode exhaust processing system 105 is configured to process anode exhaust gas output from anode outlet 121 of fuel cell module 100. Anode exhaust received by anode exhaust blower 110 (e.g., processed stream) may be subsequently output for further processing, collection, or export from the fuel cell system 10. An operation speed of anode exhaust blower 110 is controlled by a communicatively coupled controller 113 ("speed controller"). Controller 113 is configured to maintain and/or adjust a speed of anode exhaust blower 110 based on the pressure differential measured by PDT 125, which is communicatively coupled via communication pathway 127. In various embodiments, PDT 125 may communicate with controller 113 via wired and/or wireless communication.

Fuel cell system 10 includes actively-controlled gas injection system 115 configured to facilitate pressure rebalance, which is disposed between the anode outlet 121 and the anode exhaust processing system 105. As previously described, anode under-pressure may occur if the speed of anode exhaust blower 110 is not timely adjusted by controller 113 (based on the pressure differential measured by PDT 125) according to flow or pressure fluctuations of the anode inlet, anode exit, or cathode inlet streams. To prevent anode under-pressurization (i.e., an under-pressurized condition), gas injection system 115 injects an inert and/or reducing gas into a conduit in fluid communication with at least one of the anode inlet 122 and the anode outlet 121 (e.g., anode exhaust pipe 120). As shown in FIG. 1, gas injection system 115 is configured to inject gas within the anode exhaust pipe 120 via injection pathway 165, disposed downstream of the anode outlet 121 and upstream of the anode exhaust processing system 105.

Gas injection system 115 includes a gas injection tank 170, which contains pressurized gas for injection within the fuel cell system 10. In various embodiments, the supplied gas may be nitrogen, carbon dioxide, and/or another inert or reducing gas. Injection of gas from within gas injection tank 170 is facilitated by one or more high speed opening valves 180, which controllably enable or prohibit gas flow into injection pathway 165. In various embodiments, injection of gas from within injection tank 170 is carried out in response to an actuation signal received by a controller communicatively coupled to gas injection system 115. In various embodiments, the actuation signal may be sent to the controller based on a determination (e.g., by one or more additional controllers in communication with the PDT 125) that a pressure differential exceeds a predetermined threshold. The gas injection tank 170 is also in fluid communication with a bleed down line 183, which is configured to enable release of gas from the gas injection tank 170 via a pressure control valve 185. The gas injection tank 170 may receive gas from a receiver tank 190, wherein flow from the receiver tank 190 to the gas injection tank 170 is metered by a valve 195. The receiver tank 190 may correspondingly receive gas from a gas supply 197, wherein flow from the gas supply 197 to the receiver tank 190 is metered by a valve 199. Receiver tank 190 may be configured to limit a peak flow rate of gas (e.g., from the gas supply 197) and consequently limit a peak demand on the gas supply 197.

Pressure within the gas injection tank 170 is maintained by controlling valves 195 and/or 185. In various embodiments, gas injection tank 170 may be in direct fluid communication with the gas supply 197 such that gas may flow directly from the gas supply 197 into the gas injection tank 170. In various other embodiments, the gas injection system 115 may include a plurality of receiver tanks similar or equivalent to receiver tank 190, which are each configured to receive gas from gas supply 197 for eventual flow into injection tank 170.

In various embodiments, the gas injection tank 170 may be maintained at a target pressure or pressure set point, wherein the target pressure and/or pressure set point may be based on an operating condition of the fuel cell system 10 and/or a power plant containing the fuel cell system 10. Adjustability of the pressure within gas injection tank 170 enables precision control of an effect of gas injection on the pressure differential within fuel cell module (e.g., between P1 and P2, or between P3 and P2). In various embodiments, gas injection tank 170 may be configured for rapid refill to assure readiness for potential repeated anode under-pressure events. In these embodiments, rapid refill of gas injection tank 170 may exceed the predetermined target pressure and/or pressure set point. When pressure within gas injection tank 170 exceeds the predetermined target pressure and/or pressure set point during rapid refill, pressure control valve 185 may open to facilitate venting of gas from within the gas injection tank 170 (e.g., via bleed down line 183) and subsequently enable return to the predetermined desired pressure therein.

During operation, when a pressure change is detected (e.g., by PDT 125 or one or more pressure sensors within and/or adjacent to the fuel cell module 100), specifically when a pressure associated with the anode within the fuel cell module 100 (e.g., P1 and/or P3) is low or drops relative to a pressure associated with the cathode within the fuel cell module (e.g., P2), gas injection system 115 is configured to inject gas from the gas injection tank 170 into anode exhaust pipe 120 (and/or anode inlet 122). In various embodiments, the fuel cell module 100, the gas injection system 115, and/or the PDT 125 may be communicatively coupled to one or more controllers, wherein the one or more controllers may cause the gas injection system to inject gas responsive to a determination that the PDT 125 detects a pressure differential exceeds a predetermined pressure threshold. The injected gas subsequently restores pressure balance within the fuel cell module and, consequently, the fuel cell system 10. In various embodiments, the gas injection system 115 may be configured to inject gas from gas injection tank to anode inlet 122 and/or anode exhaust pipe 120 based on one or more operating parameters associated with the fuel cell system 10. In various embodiments, gas injection system 115 may be configured to operate in anticipation of potential pressure changes within the fuel cell module 100, which may enable quicker pressure rebalance compared to a reactionary gas injection operation based on the measured pressure differential at PDT 125. In various embodiments, a speed and/or volume of gas injection from the gas injection system 115 may be based on the one or more operating parameters associated with fuel cell system 10.

Figure 2:
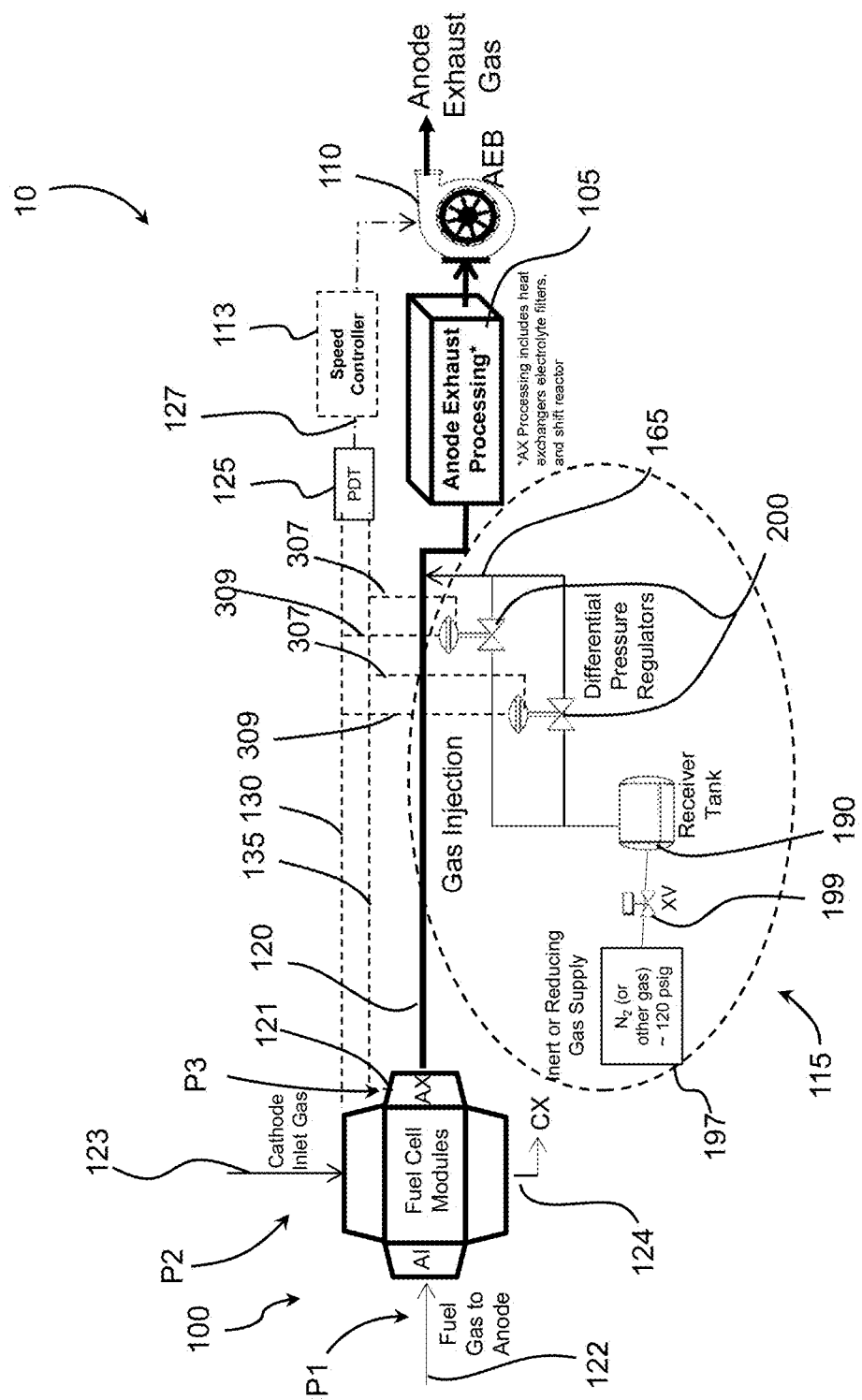
FIG. 2 is a schematic representation of a fuel cell system including a gas injection system with passive-control valves, according to an exemplary embodiment.

FIG. 2 shows a schematic representation of a fuel cell system 10, which incorporates a passively-controlled gas injection system 115, according to an exemplary embodiment. As shown, fuel cell system 10 includes a fuel cell module 100, which is in fluid communication with each of an anode exhaust processing system 105, an anode exhaust blower 110 controlled by controller 113, and a passively-controlled gas injection system 115 configured to facilitate rebalancing a pressure differential, wherein the fluid communication is facilitated by anode exhaust pipe 120 (e.g., conduit).

As shown in FIG. 2, PDT 125 may be configured to measure a pressure differential between the anode outlet 121 (P3) and the cathode inlet 123 (P2) via gas pressure sensing lines 135 and 130, respectively. In various embodiments, PDT 125 may be configured to measure a pressure differential between P1 and P2, or between P3 and P2. As previously described, the fuel cell system 10 includes anode exhaust blower 110, which is configured to receive anode exhaust (via anode exhaust pipe 120) from anode exhaust processing system 105 and is controlled by communicatively coupled controller 113 ("speed controller"). Controller 113 is configured to maintain and/or adjust a speed of anode exhaust blower 110 based on the pressure differential measured by PDT 125, which is communicatively coupled via communication pathway 127.

Fuel cell system 10 includes passively-controlled gas injection system 115 configured to facilitate pressure rebalance, which is disposed between the anode outlet 121 and the anode exhaust processing system 105. As previously described, anode under-pressure may occur if the speed of anode exhaust blower 110 is not timely adjusted by controller 113 (based on the pressure differential measured by PDT 125). To prevent anode under-pressurization, gas injection system 115 injects an inert and/or reducing gas into a conduit in fluid communication with at least one of the anode inlet 122 and the anode outlet 121 (e.g., anode exhaust pipe 120). As shown in FIG. 2, gas injection system 115 is configured to inject gas within the anode exhaust pipe 120 via injection pathway 165, disposed downstream of the anode outlet 121 and upstream of the anode exhaust processing system 105.

Gas injection system 115 includes a receiver tank 190, which contains gas for injection within the fuel cell system 10. The receiver tank 190 may receive gas from a gas supply 197, wherein flow from the gas supply 197 to the receiver tank 190 is metered by a valve 199. In various embodiments, the supplied gas may be nitrogen, carbon dioxide, and/or another inert or reducing gas. Injection of gas from within receiver tank 190 is facilitated by one or more differential pressure regulators 200, which passively control gas flow into injection pathway 165. As shown, differential pressure regulators 200 may be actuated by pressures associated with anode outlet 121 (e.g., P3) and cathode inlet 123 (e.g., P2) via gas pressure sensing lines 307 and 309, respectively. In various embodiments, injection of gas from within receiver tank 190 is carried out when a pressure at the anode outlet 121 (e.g., P3) is a threshold amount below a pressure at the cathode inlet 123 (e.g., P2), which may cause differential pressure regulators 200 to open and enable gas flow therethrough and into the injection pathway 165, wherein the gas subsequently enters the anode exhaust pipe 120. When a pressure rebalance has been achieved (e.g., as determined from gas pressure sensing lines 307 and 309), differential pressure regulators 200 may subsequently close and prohibit further gas flow. In various embodiments, differential pressure regulators 200 may be in direct fluid communication with the gas supply 197 such that gas may flow directly from the gas supply 197 to the differential pressure regulators 200. In various other embodiments, the gas injection system 115 may include a plurality of receiver tanks similar or equivalent to receiver tank 190, which are each configured to receive gas from gas supply 197 for eventual flow into fuel cell system 10. In various embodiments, passively-controlled gas injection system 115 may also include a pressure-controlled injection tank (e.g., similar or equivalent to tank 170) in fluid communication with receiver tank 190.

Figure 3:
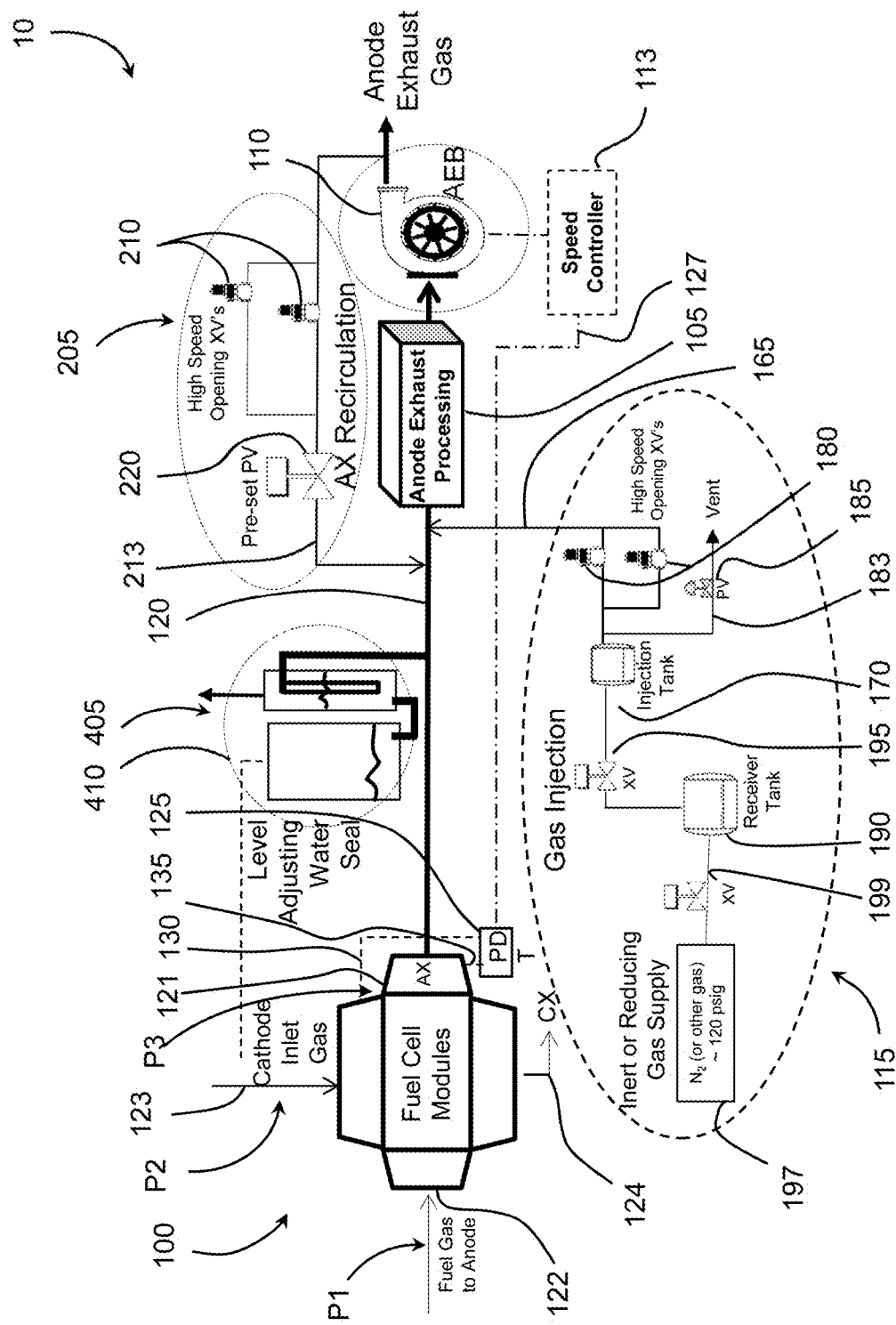
FIG. 3 is a schematic representation of a fuel cell system including a gas injection system and also having the optional systems of anode recirculation and level adjusting water seal, according to an exemplary embodiment.

In various embodiments, gas injection system 115 may be configured to operate cooperatively with an anode exhaust recirculation system included within a fuel cell system (e.g., fuel cell system 10) to rebalance pressure therein. In various exemplary embodiments, fuel cell system 10 may include an anode exhaust recirculation system 205, as shown in FIG. 3, which is configured to operate in cooperation with a gas injection system 115 to provide pressure rebalance and prevent anode under-pressurization. In various embodiments, exhaust recirculating system 205 is configured to facilitate flow of processed anode exhaust (e.g., processed stream) back to a lower-pressure gas pathway upstream of the anode exhaust blower 110 to reduce or eliminate anode under-pressurization. Exhaust recirculating system 205 may be fluidly coupled, via a pathway 213, to anode exhaust pipe 120 and may be configured to facilitate flow of processed anode exhaust into the anode exhaust pipe 120.

Figure 4:
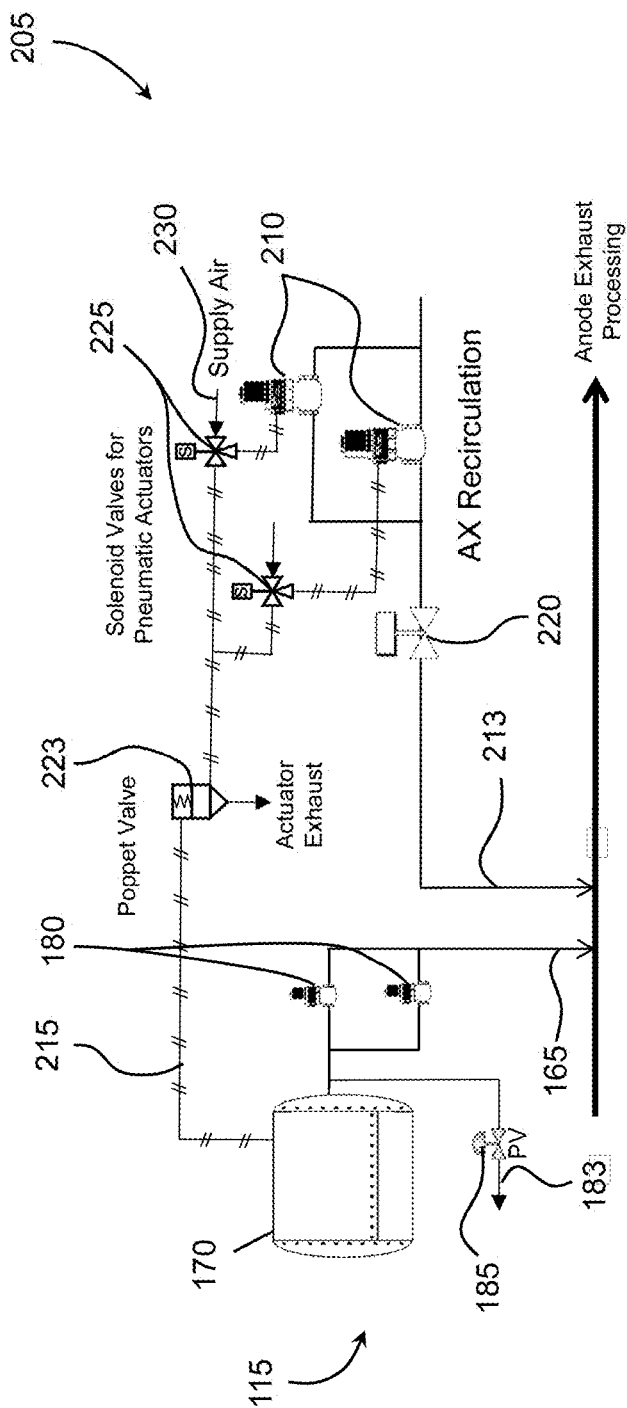
FIG. 4 is a schematic representation of a gas injection system having active-control valves used in conjunction with an anode gas recirculation system, where the anode gas recirculation is passively prevented from actuating at the same time as the gas injection system, according to an exemplary embodiment.

FIG. 4 shows a schematic representation of an actively-controlled gas injection system 115 configured to operate in series with exhaust recirculation system 205 within a fuel cell system 10, according to an exemplary embodiment. In various embodiments, to prevent concurrent operation rather than the desired series operation of the gas injection system 115 and the exhaust recirculation system 205, which may cause anode over-pressure, the exhaust recirculation system 205 may be configured to operate only after a pressure within gas injection tank 170 has decreased below a threshold pressure. Delaying operation of exhaust recirculation system 205 until after the pressure of the injection tank 170 is below a threshold pressure reduces a risk of excessive gas pressure within the anode inlet 122 (e.g., P1) and/or the anode outlet 121 (e.g., P3) and consequently reduces a risk of anode over-pressure. In various embodiments, the exhaust recirculation system 205 may be configured to operate based on a pressure within receiver tank 190.

As shown, gas injection system 115 is in fluid communication with exhaust recirculation system 205 via a fluid communication pathway 215. Gas injection system 115 includes high speed opening valves 180, which facilitate injection of gas from injection tank 170 into a flow pathway 165, wherein flow pathway 165 is in fluid communication with anode inlet 122 and/or anode outlet 121. FIG. 4 shows flow pathway 165 in fluid communication with anode exhaust pipe 120. Fluid communication pathway 215 includes a poppet valve 223, which is configured to coordinate operation of gas injection system 115 and exhaust recirculation system 205 based on a pressure threshold. Poppet valve 223 is disposed in series with solenoid valves 220, which when open simultaneously with poppet valve 223, enables gas flow through exhaust recirculation system 205 via valves 210. In various embodiments, the pressure threshold is based on a pressure associated with the receiver tank 190 and/or a venting pressure of solenoid valves 225. In various embodiments, venting pressure within solenoid valves 225 corresponds to a pressure of actuating gas 230 within the exhaust recirculating system 205. In various embodiments, solenoid valves 225 may be controlled by a controller.

In various embodiments, poppet valve 223 is configured to open when a venting pressure of solenoid valves 225 meets a threshold pressure greater than the pressure associated with the injection tank 170. In some embodiments, the poppet valve 223 is configured to open when the venting pressure of solenoid valves 225 is at least approximately 10 times greater than a pressure within the injection tank 170. In some embodiments, the venting pressure of solenoid valves 225 being at least approximately 10 times greater than a pressure within gas injection tank 170 may be indicative of the gas injection tank 170 releasing a majority of its contained pressurized gas. For example, a 10:1 ratio of solenoid valve 225 venting pressure to a pressure within injection tank 170 would require pressure within the injection tank 170 to fall below approximately 10 psi before solenoid valves 225 may open to enable actuating gas 230, with a corresponding pressure of approximately 100 psi, to flow therethrough. Thus, controlling operation of exhaust recirculation system 205 via poppet valve 223 based on a pressure within gas injection system 115 prevents inadvertent operation of exhaust recirculation system 205 to correspondingly reduce risk of excessive gas pressure within the anode inlet 122 (e.g., P1) and/or anode outlet 121 (e.g., P3) and consequently prevent anode over-pressure.

Figure 5:
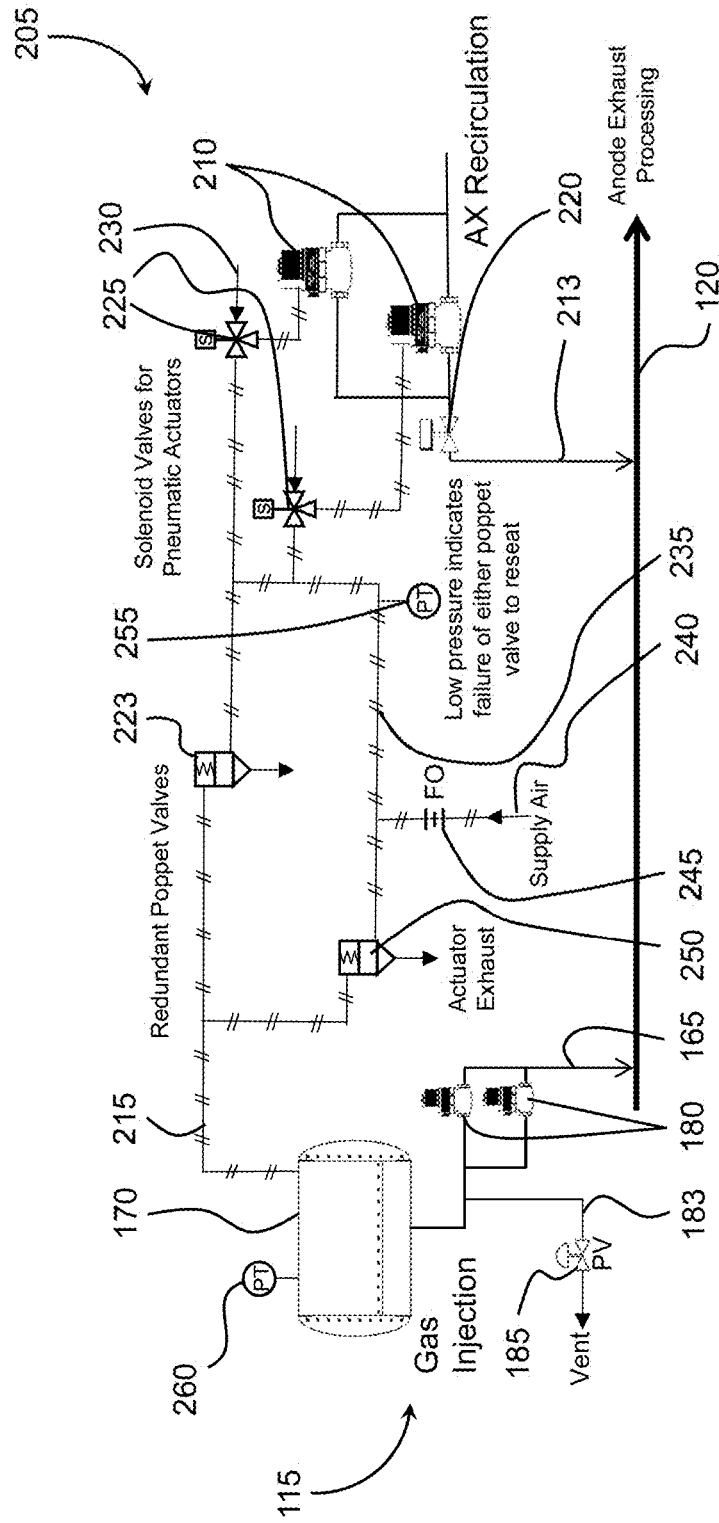
FIG. 5 is a schematic representation of a gas injection system having active-control valves used in conjunction with an anode gas recirculation system, where the anode gas recirculation is passively prevented from actuating at the same time as the gas injection system, according to another exemplary embodiment.

FIG. 5 shows anode exhaust recirculation system 205, within fuel cell system 10, which is configured to operate in cooperation with an actively-controlled gas injection system 115 to provide pressure rebalance and prevent anode under-pressurization. Exhaust recirculation system 205 includes one or more high speed exhaust valves 210, which are configured to control a flow of gas through pathway 213 and facilitate injection of processed anode exhaust (e.g., processed stream) into anode exhaust pipe 120. Gas injection system 115 and exhaust recirculation system 205 may be configured to operate cooperatively to restore a pressure balance within fuel cell system 10 in response to a detected change in pressure associated with fuel cell module 110 in order to prevent anode under-pressure. Gas injection system 115 and exhaust recirculation system 205 are in fluid communication via fluid communication pathway 215. Fluid communication pathway 215 includes poppet valve 223, which is configured to coordinate operation of gas injection system 115 and exhaust recirculation system 205 based on a pressure threshold. Poppet valve 223 is disposed in series with solenoid valves 225, which when open simultaneously with poppet valve 223 opens the exhaust recirculation valves 210 and flow through exhaust recirculation system 205 via valves 210. In various embodiments, if a pressure within gas injection tank 170 is below a threshold amount, poppet valve 223 may open and enable gas, from actuation gas 230, to flow therethrough if solenoid valves 225 have been actuated (e.g., via a controller). In various embodiments, the solenoid valves 225 may be actuated based on a pressure differential detected within fuel cell module 100 (e.g., by PDT 125). In various embodiments, poppet valve 223 is configured as failsafe to ensure that gas does not flow through exhaust recirculation system 205 in the event of solenoid valves 225 actuating failure (e.g., opening at the wrong time, or for a prolonged period of time).

As shown, a second fluid communication pathway 235 may be fluidly coupled between exhaust recirculation system 205 and gas injection system 115. In various embodiments, gas flow through second fluid communication pathway 235 is enabled when redundant poppet valve 250 is in an open configuration. The second fluid communication pathway 235 is configured to enable gas flow from actuation gas 240 (via a flow orifice 245) to ensure that both the poppet valve 223 and redundant poppet valve 250 receive full actuation pressure (after sufficient time to fill the communication pathway 235 by flow of actuation gas 240 through flow orifice 245) and in turn assure that poppet valve 223 and/or 250 will open when the pressure in the gas injection tank 170 is approximately $\frac{1}{10}^{th}$ the pressure of the actuation pressure, such that recirculation valves 210 are certain to open to enable pressure rebalance within fuel cell system 10 by providing gas within the anode exhaust pipe 120 if poppet valve 223 has failed closed.

In some embodiments, if poppet valve 223 has failed open, solenoid valves 225 may permit gas flow therethrough (e.g., based on a signal from a communicatively coupled controller) independent of a pressure within the gas injection tank 170 (and/or a pressure associated with fuel cell module 100), which could lead to anode over-pressure. To confirm that neither of the two poppet valves 223 and/or 250 have failed open, the pressure in the line 235 may be measured by a pressure transmitter 255 within fluid communication pathway 235, disposed between the solenoid valves 225 and poppet valves 223 and 250, and may be configured to confirm the high pressure resulting from gas provided by actuation gas 240 within the redundant fluid communication pathway 235. Pressure maintained at pressure transmitter 255 assures that poppet valves 235 and 250 are fully closed. In various embodiments, gas injection tank 170 may be similarly monitored via a pressure transmitter 260, which is configured to detect and monitor pressure therein. In various embodiments, solenoid valves 225 may be actuated (e.g., via a controller) when a pressure within gas injection tank 170 (as detected by pressure transmitter 260) falls below a predetermined threshold.

Figure 6:
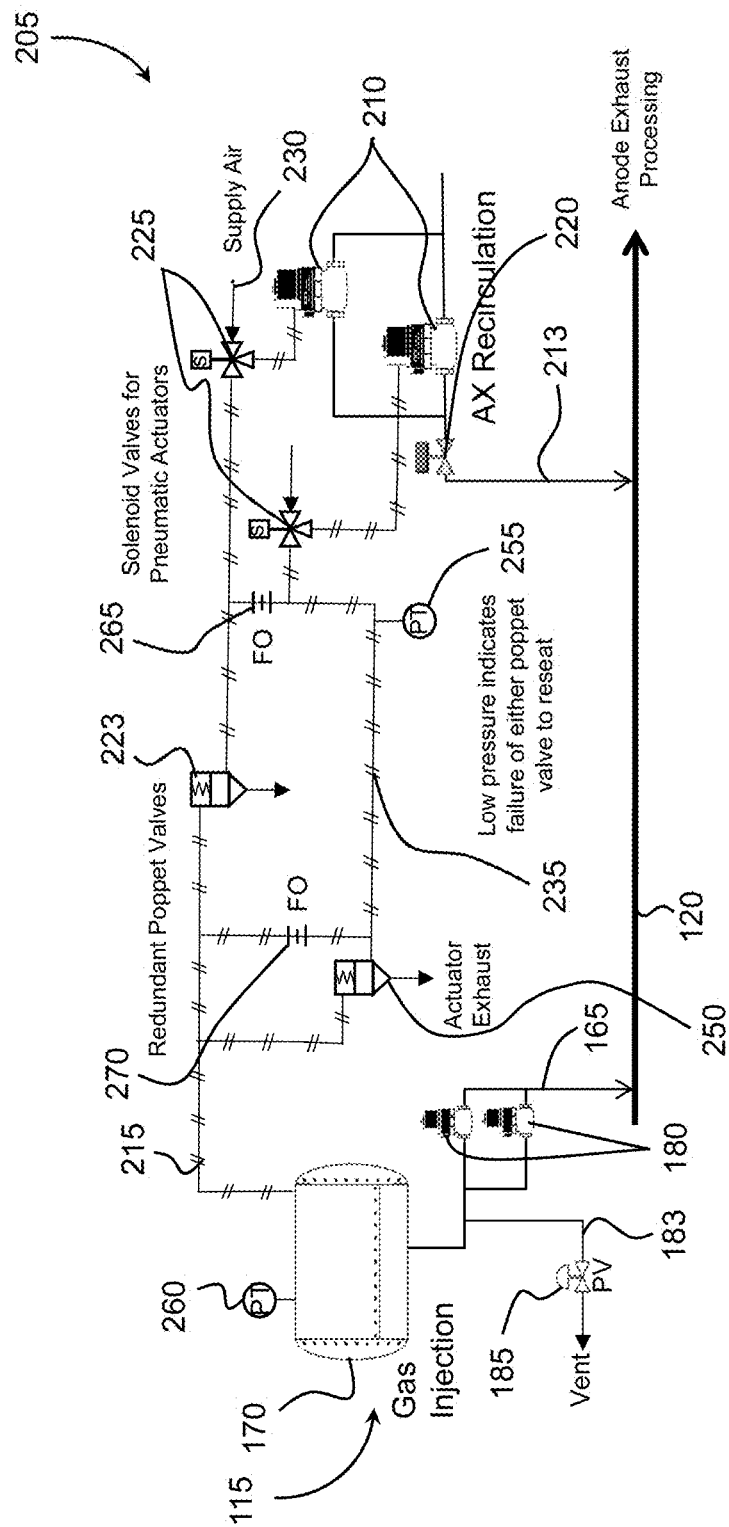
FIG. 6 is a schematic representation of a gas injection system having active-control valves, according to another exemplary embodiment.

FIG. 6 shows a schematic representation of an alternate configuration of actively-controlled gas injection system 115 in fluid communication with exhaust recirculation system 205 within fuel cell system 10, according to another exemplary embodiment. As shown, gas injection system 115 is in fluid communication with exhaust recirculation system 205 via fluid communication pathway 215. As previously described, gas injection system 115 and exhaust recirculation system 205 may be configured to operate cooperatively to restore a pressure balance within fuel cell system 10 in response to a detected change in pressure (e.g., P1, P2, and/or P3) and/or pressure differential associated with fuel cell module 100 (e.g., as detected by PDT 125). In various embodiments, if a pressure within gas injection tank 170 is below a threshold amount, poppet valve 223 may open and enable gas, from actuation gas 230, to flow therethrough if solenoid valves 225 have been actuated (e.g., via a controller). In various embodiments, the solenoid valves 225 may be actuated based on a pressure differential detected within fuel cell module 100 (e.g., by PDT 125). In various embodiments, poppet valve 223 is configured as failsafe to ensure that gas does not flow through the exhaust recirculation system 205 until the gas injection tank pressure 260 is below a certain threshold in the event of solenoid valves 225 actuating failure (e.g., opening at the wrong time, or for a prolonged period of time).

As shown, a second fluid communication pathway 235 is disposed between gas injection system 115 and exhaust recirculation system 205. The second fluid communication pathway 235 includes pressure transmitter 255 and flow orifices 265 and 270. In various embodiments, gas flow through the second fluid communication pathway 235 is enabled when either poppet valve 223 or redundant poppet valve 250 are in an open configuration. Flow orifices 265 and 270 are configured to enable gas flow between fluid communication pathway 215 and second fluid communication pathway 235 such that the pressure as measured by the pressure transmitter 255 will be approximately equal to the gas injection tank pressure (as measured by pressure transmitter 260) when the solenoid valves 225 are not actuating (i.e., are closed), and will be approximately equal to the actuator supply air 230 pressure when the solenoid valves 225 are actuating (i.e., are open), to enable determination of failure (i.e., wrong position) of either poppet valve 223 or 250, and/or solenoid valves 225, during operation of fuel cell system 10. As these are redundant safety systems (e.g., second fluid pathway 235, flow orifices 265 and 270, redundant poppet valve 250) to assure that the recirculation system 205 does not flow at the same moment as the gas injection system 115, detected failure of any of the redundant valves (e.g., valve 223, 250) may inform and allow potential replacement or repair prior to fuel cell system 10 operations which may place the fuel cell module 100 at risk of damage from anode over pressurization.

In some embodiments, if poppet valve 223 has failed open, solenoid valves 225 (e.g.,. in response to an actuation signal received by a communicatively coupled controller) may permit gas flow therethrough independent of a pressure within gas injection tank 170 and/or a pressure differential associated with fuel cell module 100, which could lead to anode over-pressure independent of redundant poppet valve 250 also failed open. To ensure that poppet valves 223 and 250 have not failed open, gas flow through flow orifices 265 and/or 270 may provide a pressure upstream of redundant poppet valve 250 by enabling gas flow therethrough. Accordingly, second fluid communication pathway 235 may include pressure transmitter 255, disposed between the solenoid valves 225 and redundant poppet valve 250, configured to confirm pressure resulting from gas flow therein facilitated by flow orifices 265 and/or 270. Pressure maintained at pressure transmitter 255 assures that poppet valves 223 and 250 are fully closed. In various embodiments, gas injection tank 170 may be similarly monitored via a pressure transmitter 260, which is configured to detect and monitor pressure therein. In various embodiments, solenoid valves 225 may be actuated (e.g., via a controller) when a pressure within gas injection tank 170 (as detected by pressure transmitter 260) falls below a predetermined threshold.

In various embodiments, fuel cell system 10 may include additional over- and/or under-pressure safeguards that may be implemented simultaneously in series or in parallel with gas injection system 115, such as a water seal. For example, fuel cell system 10 may include water seal system 405 (as shown in FIG. 3), which is in fluid communication with fuel cell module (e.g., via anode exhaust pipe 120 and/or communication pathway 410) to prevent anode over-pressure (e.g., over-pressurization condition).

In various embodiments, gas injection system 115 may be implemented as a sole pressure rebalancing system within fuel cell system 10 or gas injection system 115 may be cooperatively operated with one or more additional pressure mitigating systems (e.g., exhaust recirculation system 205, water seal system 405) to facilitate minimization, prevention, or elimination of excessive pressure differentials within fuel cell system 10. In any of the various preceding embodiments, gas injection system 115 (actively- or passively-controlled) may be configured to operate when a pressure differential causes a short-duration anode under-pressure event. In various embodiments, exhaust recirculation system 205 may be configured to operate when a pressure differential causes a longer-duration anode under-pressure event. In various embodiments, short-duration events may be classified as events lasting approximately between 0.5 seconds and 5 seconds. In various embodiments, longer-duration events may be classified as events lasting approximately between 2 seconds and 20 seconds.

In various embodiments, when the exhaust recirculation system is used in conjunction with the gas injection system, a passive system may be employed to ensure that the exhaust recirculation system only actuates after the gas injection system. In various embodiments, solenoid valves 225 within exhaust recirculation system 205 may only open after gas injection system 115 has released the gas pressure in the injection tank below a threshold level. In various embodiments, solenoid valves 225 within exhaust recirculation system 205 may only open after gas injection system 115 has been in operation (e.g., when valves 180 or regulators 200 are in an open configuration) for a predetermined period of time. In some embodiments, the predetermined period of time may correspond to a longer-duration event (e.g., at least 2 seconds).

In various embodiments, gas injection system 115 may operate during or directly in response to one or more alarm conditions. In various embodiments, the one or more alarm conditions may correlate to anode under-pressure and/or a change in pressure differential within fuel cell system 10 that exceeds a predetermined threshold change. In various embodiments, gas injection system 115 may operate cooperatively with exhaust recirculation system 205 during or directly in response to one or more alarm conditions, wherein gas injection system 115 may operate (e.g., valves 180 or regulators 200 may open) during or in response to an alarm condition associated with a lower severity and recirculation system 205 may operate (e.g., solenoid valves 225 may open) during or in response to an alarm condition with a higher severity. In various embodiments, the alarm condition may correspond to a differential pressure associated with fuel cell module 100. For example, gas injection system 115 may operate (e.g., valves 180 or regulators 200 may open) when a differential pressure reaches −1 inches of water column (iwc) whereas exhaust recirculation system 205 may operate (e.g., valves 210 may open) when a differential pressure reaches −4 iwc.

Notwithstanding the embodiments described above in FIGS. 1-6, various modifications and inclusions to those embodiments are contemplated and considered within the scope of the present disclosure.

It is also to be understood that the construction and arrangement of the elements of the systems and methods as shown in the representative embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed.

Accordingly, all such modifications are intended to be included within the scope of the present disclosure. Any means-plus-function clause is intended to cover the structures described herein as performing the recited function and not only structural equivalents but also equivalent structures. Other substitutions, modifications, changes, and omissions may be made in the design, operating conditions, and arrangement of the preferred and other illustrative embodiments without departing from scope of the present disclosure or from the scope of the appended claims.

Furthermore, functions and procedures described above may be performed by specialized equipment designed to perform the particular functions and procedures. The functions may also be performed by general-use equipment that executes commands related to the functions and procedures, or each function and procedure may be performed by a different piece of equipment with one piece of equipment serving as control or with a separate control device.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances, where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

Moreover, although the figures show a specific order of method operations, the order of the operations may differ from what is depicted. In addition, two or more operations may be performed concurrently or with partial concurrence. Such variation will depend on hardware systems chosen and on designer choice. All such variations are within the scope of the disclosure.

What is claimed is:

1. A fuel cell system comprising:
a fuel cell module comprising:

an anode having an anode inlet configured to receive anode feed gas and an anode outlet configured to output anode exhaust into an anode exhaust conduit; and a cathode having a cathode inlet configured to receive cathode feed gas and a cathode outlet;

an anode exhaust processing system fluidly coupled to the anode exhaust conduit;

a gas injection system disposed downstream of the anode outlet and upstream of the anode exhaust processing system, the gas injection system comprising at least one tank in fluid communication with a gas supply, the at least one tank configured to contain gas received from the gas supply, wherein the at least one tank is structured to provide a flow of gas into the anode exhaust conduit; and an anode exhaust recirculation system fluidly coupled downstream of the anode exhaust processing system, the anode exhaust recirculation system configured to recirculate anode exhaust from the anode exhaust processing system to the anode exhaust conduit;

wherein the at least one tank is fluidly coupled to at least one controlling valve, the at least one controlling valve configured to maintain a pressure within the at least one tank at a predetermined set point;

wherein the gas injection system is configured to inject a gas within the anode exhaust conduit upon detection of an under-pressurization condition of the anode; and wherein the anode exhaust recirculation system is configured to recirculate anode exhaust from the anode exhaust processing system to the anode exhaust conduit responsive to a determination that the pressure within the at least one tank is below the predetermined set point.

2. The fuel cell system of claim 1, wherein the at least one tank includes a first tank and a second tank, the first tank being directly coupled to a gas supply and the second tank being configured to receive the gas from the first tank, and wherein a flow of the gas from the first tank to the second tank is metered by a first valve.

3. The fuel cell system of claim 1, wherein a pressure within the at least one tank is maintained at a predetermined set point based on an operating condition of the fuel cell system.

4. The fuel cell system of claim 1, wherein the gas injection system is configured to inject the gas responsive to a determination that a pressure differential exceeds a predetermined threshold.

5. The fuel cell system of claim 1, wherein the gas injection system is configured to inject gas based on an operating parameter associated with the fuel cell module.

6. The fuel cell system of claim 1, wherein the anode exhaust recirculation system is configured to operate cooperatively with the gas injection system, wherein the anode exhaust recirculation system is configured to operate in series with the gas injection system.

7. The fuel cell system of claim 1, further comprising a first poppet valve disposed within a first pathway fluidly coupled between the anode exhaust recirculation system and the gas injection system.

8. The fuel cell system of claim 7, wherein the first poppet valve is fluidly coupled in series with at least one other valve, the at least one other valve configured to allow flow through the anode exhaust recirculation system.

9. The fuel cell system of claim 7, further comprising a second valve disposed within a second fluid pathway fluidly coupled between the anode exhaust recirculation system and the gas injection system, wherein at least one of the first valve or the second valve is fluidly coupled in series with a pressure transmitter, and wherein an output from the pressure transmitter indicates that at least one of the first or the second valve is failed open.

10. The fuel cell system of claim 1, further comprising a water seal system in fluid communication with the fuel cell module and configured to prevent an over-pressurization condition of the anode.

11. The fuel cell system of claim 8, wherein the at least one other valve is a solenoid valve.

12. A fuel cell system comprising:
an anode having an anode inlet and an anode outlet, the anode inlet configured to receive anode feed gas and the anode outlet configured to output anode exhaust into an anode exhaust conduit;
an anode exhaust processing system fluidly coupled downstream of the anode exhaust conduit;
a gas injection system disposed downstream of the anode outlet, the gas injection system comprising:
at least one tank; and
a gas supply in communication with the at least one tank, the gas supply comprising a pressurized gas, the pressurized gas being at least one of an inert gas or a reducing gas;
wherein the at least one tank is structured to:
receive the pressurized gas from the gas supply;
contain the pressurized gas at a predetermined pressure; and
provide a flow of the pressurized gas into the anode exhaust conduit upon detection of an under-pressurization condition of the anode; and
an anode exhaust recirculation system fluidly coupled downstream of the anode exhaust processing system, the anode exhaust recirculation system being configured to recirculate anode exhaust from the anode exhaust processing system to the anode exhaust conduit responsive to a determination that the pressure within the at least one tank is below the predetermined pressure.

13. The fuel cell system of claim 12, wherein the at least one tank comprises a first tank and a second tank.

14. The fuel cell system of claim 12, wherein the pressure within the at least one tank is set based on an operating condition of the fuel cell system.

15. The fuel cell system of claim 12, wherein the pressurized gas is nitrogen.

16. The fuel cell system of claim 12, wherein the pressurized gas is carbon dioxide.

17. The fuel cell system of claim 12, further comprising:
a cathode having a cathode inlet and a cathode outlet; and
a pressure differential transmitter configured to measure a pressure differential between the cathode inlet and the anode outlet.

18. The fuel cell system of claim 17, wherein the at least one tank is configured to provide the flow of the pressurized gas into the anode exhaust conduit responsive to a determination that the pressure differential exceeds a predetermined threshold.

* * * * *